United States Patent [19]
Miser et al.

[11] Patent Number: 5,480,163
[45] Date of Patent: Jan. 2, 1996

[54] LIP SEAL WITH REINFORCED BACKUP

[75] Inventors: Hank T. Miser, Missouri City; Frederick B. Pippert, Sugar Land; John T. Rogers, Plano, all of Tex.

[73] Assignee: Utex Industries, Inc., Houston, Tex.

[21] Appl. No.: 102,565

[22] Filed: Aug. 5, 1993

[51] Int. Cl.⁶ ..................................................... F16J 15/32
[52] U.S. Cl. .......................... 277/188 A; 277/205; 92/254
[58] Field of Search .......................... 277/188 R, 188 A, 277/205; 92/240, 241, 249, 254

[56] References Cited

U.S. PATENT DOCUMENTS

| | | |
|---|---|---|
| 2,189,839 | 2/1940 | Sharp et al. |
| 2,330,197 | 9/1943 | Allen et al. ........................ 277/188 A |
| 2,808,301 | 10/1957 | Bowerman ............................ 92/254 |
| 2,815,973 | 12/1957 | Jackson ............................. 277/188 A |
| 4,027,816 | 6/1977 | Slator et al. ........................ 277/205 X |
| 4,053,166 | 10/1977 | Domkowski ........................ 277/205 X |
| 4,143,586 | 3/1979 | Zitting ............................... 277/188 A X |
| 4,281,590 | 8/1981 | Weaver ............................... 92/244 |
| 4,346,647 | 8/1982 | Weaver ............................... 92/243 |
| 4,428,590 | 1/1984 | Pippert et al. ..................... 277/188 A |
| 4,596,395 | 6/1986 | Miser ................................. 277/123 |
| 4,601,235 | 7/1986 | Roberts ............................. 277/188 A X |

FOREIGN PATENT DOCUMENTS

| | | | |
|---|---|---|---|
| 2628812 | 9/1989 | France ................................ 277/188 A |
| 2530746 | 2/1976 | Germany .......................... 277/188 A |
| 0797684 | 7/1958 | United Kingdom ............... 277/188 A |
| 1437358 | 5/1976 | United Kingdom ............... 277/188 R |

OTHER PUBLICATIONS

"Southwest—Fail-safe Slush Pistons," *Composite Catalogue of Oil Field Equipment and Services*, vol. 4, p. 6506. World Oil, 1980–81.

*Primary Examiner*—Diego F. F. Gutierrez
*Assistant Examiner*—John L. Beres
*Attorney, Agent, or Firm*—Browning, Bushman, Anderson & Brookhart

[57] ABSTRACT

A replaceable sealing member is disclosed which includes a body, lip seal and bonded reinforcement section having a skirt portion and a lip support surface. The skirt portion and lip support restrict elastomeric flow of the body and lip seal portion of the sealing member to prevent extrusion damage. A radially extending flange, from which the skirt portion axially projects, is bonded to the body and has an abutment surface on one side for abutment against a shoulder in a metallic support, such as in a mud pump piston hub, for limiting axial movement of the replaceable sealing member.

14 Claims, 2 Drawing Sheets

LIP SEAL WITH REINFORCED BACKUP

BACKGROUND OF THE INVENTION

1. Field of the Invention

The present invention relates to a replaceable sealing member and, more particularly, to a unitized or monolithic lip seal with reinforced backup to limit elastomeric flow.

2. Description of the Background

In the past, various types of elastomeric lip seals have been used for general sealing purposes including, for instance, sealing around shafts and for sealing engagement between piston-cylinder mechanisms. Typical uses of elastomeric lip seals may include oil field mud pump applications such as dual- and single-acting mud pump pistons.

The flexible nature of the lip seal allows it to elastically seal with respect to a sealing surface, e.g., between a mud pump piston and a cylinder liner. However, the same flexible nature of the elastomeric lip seal makes it susceptible to extrusion forces that tend to tear, cut, or bite into the flexible lip seal material. Extrusion may occur, for example, if elastomeric material is compressed between the metallic hub portion of a mud pump piston and a metallic cylinder lining so as to be pinched upon relative movement of the two components. The elastomeric material bulges or stretches or flows under pressure into regions where the elastomeric material may be damaged. Elastomeric flow refers to the stretching or bulging of the elastomeric material to a different relative position in response to pressure. When the pressure is removed, the elastomeric material returns to the same general position. Lip seal extrusion deteriorates the condition of the seal at a rate that depends upon various factors such as lip seal flexibility, pump pressures, piston speed, types of slurries pumped and other factors.

One method for alleviating extrusion damage involves the use of a reinforcement section to limit the elastic flow of the flexible elastomeric lip seal material. Such reinforcement sections effectively form a restriction that confines or limits flow of the elastomeric lip seal material to avert extrusion.

In general, to produce a piston having a reinforcement section of this type, the reinforcement section is first machined into the metal hub of the mud pump piston. A body section having a protruding lip seal thereon is then molded or bonded to the metal hub. More specifically, it is necessary to take the following steps: (1) machine the metal hub to form the desired reinforcement section contour; (2) clean and treat the machined metal hub with a bonding agent; (3) insert the metal hub into a mold along with the elastomeric material; and (4) cure the elastomeric material to bond it to the hub typically by heating the hub along with the elastomer.

Because a complete mud pump piston is quite heavy (in many cases well over 50 lbs.), special handling during manufacture is necessary. Furthermore, significant energy is expended in the curing process due to the large mass of the piston hub, which absorbs a significant amount of heat energy.

Consequently, there remains the need for an improved, replaceable sealing member that offers dependable operation at reduced levels of capital investment. Those skilled in the art have long sought and will appreciate the present invention, which substantially alleviates these and other problems.

SUMMARY OF THE INVENTION

Therefore, an object of the present invention is to provide an improved reinforced sealing member.

Another object of the present invention is to provide a replaceable sealing member with a unitized reinforcement element for limiting elastomeric flow of a flexible lip seal.

An advantage of the present invention is reduced manufacturing costs.

Another advantage of the present invention is reduced user costs with hubs being reusable several times by replacing the reinforced sealing member.

The replaceable sealing member of the present invention is used with a metallic annular support having an annular wall and an annular shoulder extending generally transverse to the annular wall. The replaceable sealing member includes a reinforcement section having a radially extending annular flange portion and an annular skirt portion axially projecting from a first side of the flange portion. The reinforcement section further includes a lip support surface disposed radially to one side of the annular skirt portion on the first side of the radially extending annular flange portion. A body is bonded to the first side of the radially extending annular flange portion of the reinforcement section along the lip support surface and along the annular skirt portion. The body is formed of material more resilient than that of the reinforcement section. A flexible lip seal portion on the body is generally axially displaced from the lip support surface and is also formed of material more resilient than that of the reinforcement section. An annular body wall on the body engages the annular wall of the metallic annular support whereby the annular wall limits radial movement of the sealing member. An abutment surface is formed on a second side of the radially extending flange portion for abutment with the annular shoulder portion of the metallic annular support to limit axial movement of the sealing section with respect to the metallic annular support. Securing means are included to secure the replaceable sealing member to the metallic annular support.

Other features and intended advantages of the present invention will be more readily apparent by reference to the following detailed description in connection with the accompanying drawings.

Figure 1:
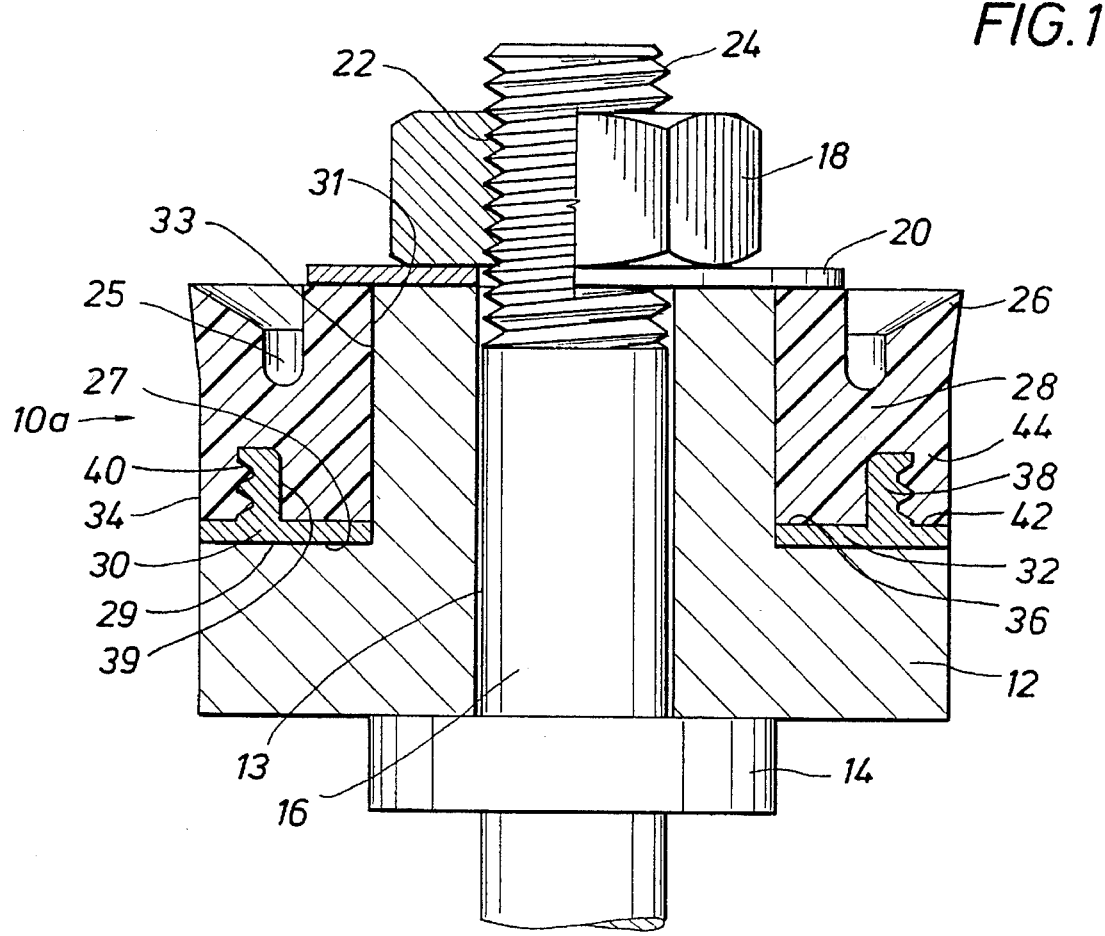
FIG. 1 is an elevational view, partially in section, of a replaceable sealing member for use with a mud pump piston hub.

While the present invention will be described in connection with presently preferred embodiments, it will be understood that it is not intended to limit the invention to those embodiments. On the contrary, it is intended to cover all alternatives, modifications, and equivalents included within the spirit of the invention and as defined in the appended claims.

DETAILED DESCRIPTION OF THE PREFERRED EMBODIMENTS

The present invention provides generally for a replaceable sealing member for use with a metallic support that may include a piston hub or shaft sealing chamber. The removable sealing member includes a flexible lip, a body portion, and a relatively rigid reinforcement section having an axially extending skirt, all of which are bonded together to form a unitized or monolithic 'replaceable sealing member.

The term "lip seal(s)" as used herein, in general, refers to any annularly extending sealing surface that forms the primary sealing surface of the seal. While, as shown in the accompanying drawings, the lip seals have feathered, or tapered, annular lips that act as primary seals, it is to be understood that the actual shape of the sealing surface or lip can vary widely in shape and design. For example, the annular sealing surface or lip can be radiused, flat (frusto-conical) or have what is commonly referred to as a reverse angle. In general, the lip portion of the lip seals will include the annular surface of the seal that exerts the primary sealing.

It is further to be noted that general terms such as "upwardly," "downwardly," "top," "bottom," and the like may be used in this specification for the sake of convenience and ease of understanding the preferred embodiments of the present invention with reference to the included drawings. Those skilled in the art will be aware that the sealing member of the present invention may be positioned differently in operation from its representation in the drawings so that such terms are for convenience only and not to be construed in any manner as limiting the present invention.

Referring now to the drawings, and more particularly to FIG. 1, there is shown sealing member 10a, for use with metallic mud pump piston hub 12. Hub 12 is typically formed of high-strength steel or other suitable material designed to withstand the high pressures encountered by mud pumps. Forces acting on the piston during each stroke may exceed 50,000 lbs. Thus, hub 12 is typically comprised of a large steel mass.

Hub 12 engages with flange 14 of piston rod 16. Hub 12 includes throughbore 13 for slidable inter-connection with piston rod 16. Nut 18 and washer 20 are used to secure sealing member 10a on hub 12 and also secure hub 12 with respect to piston rod 16. Nut 18 has internal threads 22 to engage external threads 24 of piston rod 16 for this purpose.

Sealing member embodiments 10a–10e shown in FIGS. 1–5 are formed essentially of a lip seal, body, and reinforcement section. In the embodiment of FIG. 1, these include lip seal 26, body 28, and reinforcement section 30. Although lip seal 26 and body 28 are shown in FIG. 1 as being formed in one continuous piece of the same elastomeric material, lip seal 26 and body 28 may be two separate pieces and/or comprised of two different materials. Likewise, body 28 may be comprised of different materials with different hardnesses. Sealing member 10a is supported on bottom abutment surface 27 to restrict axially downward movement by abutment with annularly extending shoulder 29 of hub 12. Shoulder 29 is generally transverse or orthogonal to annular cylindrical wall 31 of hub 12. Annular wall 31 engages body wall 33 to prevent radial movement of removable sealing member 10a. Similar movement restrictions are placed on removable seals 10b–10e with respect to the type of metallic support that is used (e.g., hub 12 or shaft seal enclosure 86).

Groove 25 has at least two purposes. Groove 25 energizes lip seal 26 in a radially outwardly direction as compression pressure within groove 25 induces expansion of groove 25. Groove 25 also acts, in a similar manner, to aid sealing between body wall 33 and annular support wall 31 of hub 12. Thus, leakage or "squirting" past sealing member 10a along annular support wall 31 of hub 12 is reduced or eliminated.

During the compression stroke, a large force may be applied to lip seal 26/body 28 that will force the elastomeric seal material to bulge or flow radially outwardly and also downwardly. As the elastomeric material bulges outwardly and downwardly under pressure, the elastomeric material may become extruded or wedged between metallic hub 12 and the corresponding cylinder wall (not shown). Thus, the elastomeric material may be pinched, cut, torn, or otherwise removed from the lip seal area during relative movement between the piston and cylinder. As material is removed by extrusion forces, lip seal 26 becomes even more flexible, thereby exacerbating the extrusion problem and leading eventually to loss of sealing.

It is desirable to allow the flexible or resilient material of lip seal 26/body 28 to expand outwardly for providing a good seal but to limit its downwardly movement to avoid extrusion damage. For this purpose, reinforcement section 30 is provided. Reinforcement section 30 includes a radially outwardly extending annular flange portion 32. In the embodiment shown in FIG. 1, flange portion 32 extends across the entire base region 34 of removable seal 10a. In other embodiments of the present invention to be discussed hereinafter, flange portion 32 may not extend across the entire base region 34 for reasons to be discussed (e.g., see FIG. 2 or FIG. 5).

Projecting axially upwardly from top side 36 of flange portion 32 is annular skirt portion 38. Skirt portion 38 engages generally elastomeric material of body 28 along ridges 40. Ridges 40 improve bonding between the elastomeric material and the relatively rigid material of reinforcement section 30. Lip support surface 42 is disposed radially outwardly of annular skirt portion 38 in this embodiment. Lip support surface 42 is axially displaced from lip 26 and positioned directly below lip 26. Lip support surface 26 extends to the circumference of sealing member 10a. In this embodiment, skirt portion 38 and lip support surface form an L-shaped reinforcement section.

In operation, skirt portion 38 and lip support surface 42 cooperate to restrict downwardly and outwardly flow of elastomeric material toward hub 12. Elastomeric flow refers to the stretching or bulging of the elastomeric material to a different relative position in response to pressure. When the pressure is removed, the elastomeric material returns to the same general position. Essentially elastomeric material flow is prevented by restricting the amount of elastomeric material that is available to move downwardly and outwardly. Elastomeric material radially inwardly of skirt 38 is prevented from bulging outwardly towards the circumference of the piston by inner wall 39. As well, the amount of elastomeric material available to flow downwardly is also limited to the material in the region 44 between ridges 40 and the circumference of the piston. In this manner, skirt portion 38 acts to prevent or alleviate extrusion problems while not interfering significantly in the sealing action of lip seal 26.

Figure 2:
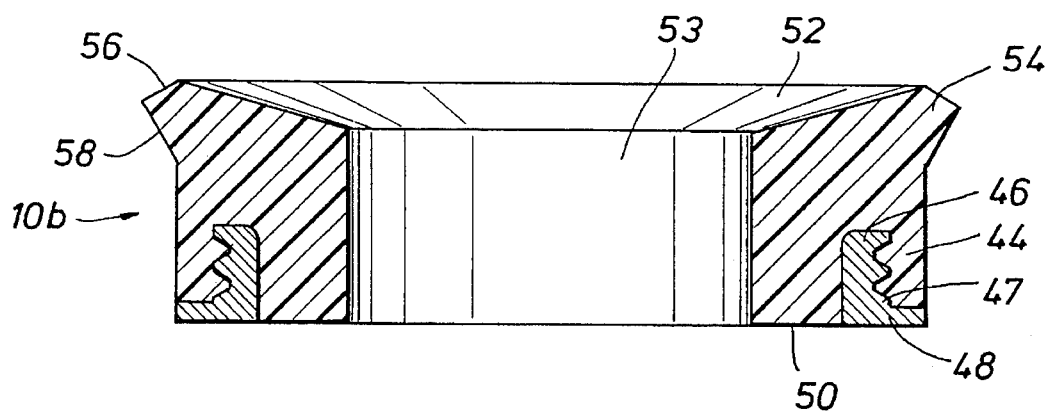
FIG. 2 is an elevational view, in section, of a replaceable sealing member having a unitized backup with a exterior lip seal.

Referring now to FIG. 2, there is shown an alternative embodiment sealing member 10b in accord with the present invention. The overall contour of skirt 46 is substantially the same as that of skirt 38. While many designs for the skirt are possible, preferably the skirt has at least a final step or taper 47 leading to the flange portion or lip support surface.

Among possible designs for skirt 48 is a widened skirt version (not shown) whereby the width of skirt 40 is extended to or approaches the inner diameter of sealing element 10b at the wall of bore 53 and may also form a second stepped or tapered portion as may be desired to cooperate with a second lip seal.

Flange portion 48 is significantly different from flange portion 32 shown in FIG. 1. In this case, the flange portion extends to the outside diameter but not to the inside diameter. The absence of the relatively harder or less flexible flange portion 32 allows the elastomeric material along lower edge 50 to seal with the hub to prevent leakage or "squirting" along the inner diameter of seal 10b past bore 53. Groove 25 is not present in sealing element 10b for preventing leakage as in sealing element 10a. Pressure against the upper surface 52 of seal 10b is transmitted to lower surface 50 for sealing so as to prevent leakage. However, a groove, such as groove 25, could be used to enhance sealing if necessary.

Lip 54 of sealing element 10b includes a downwardly sloping edge 56 and significantly greater outwardly protrusion of edge 58 as compared to lip 26 in FIG. 1. By changing the lip design with respect to the degree of radially outward protrusion, the sealing force applied by the lip to a sealing surface can be designed for the requirements of the sealing application.

Figure 3:
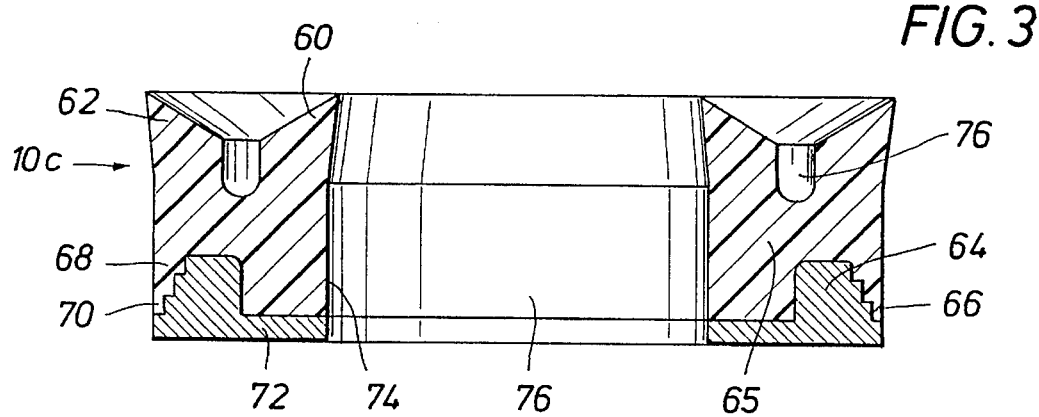
FIG. 3 is an elevational view, in section, of a replaceable sealing member having two lip seal portions.

In FIG. 3, annular skirt 64 has a contour with a stepped configuration. Other configurations (cupped, variable slope, etc.) of the generally angled surface of the annular skirt portion may also be used. The stepped surface provides additional surface area along the steps for bonding purposes and acts to prevent slippage between skirt 64 and body 65 as compared to a smoothly sloping surface. The sloping contour of skirt 64 limits the volume of elastomeric material in base region 68 to thereby limit movement, bulging, or flow of the associated elastomeric material. This construction thereby helps prevent the body material from extruding past the final step 66 at the bottom of skirt 64. Thus, the stepped, curved, or generally increasing width of the skirt as it approaches lip support surface 82 tends to restrict the flow of the elastomeric body at the normal extrusion point.

Both skirt 64 and lip support 70 are typically disposed axially below lip 62 where such reinforcement sections can provide the most effective restriction to elastomeric flow or bulging. Due to the significant narrowing of volume in base region 68, lip support surface 70 is narrower than in sealing members 10a and 10b. The degree of narrowing may be designed according to factors such as anticipated pressure, flexibility of body material, and other related factors.

In sealing member 10c, annularly radially extending flange 72 extends to inner wall 74 of bore 76. Sealing element 10c includes a double lip seal having a radially inner lip seal 60 and a radially outer lip seal 62. Sealing elements with double lip seals may be used for sealing with plungers and the like. As discussed hereinbefore, it may therefore be more desirable to provide a groove, such as groove 76, than if flange 72 did not extend to the inner diameter of sealing element 10c. Groove 76 may be used activate both lip seals. Cylinder pressure within groove 76 urges lip seal 60 radially inwardly and, in a similar manner, urges lip seal 62 radially outwardly.

Figure 4:
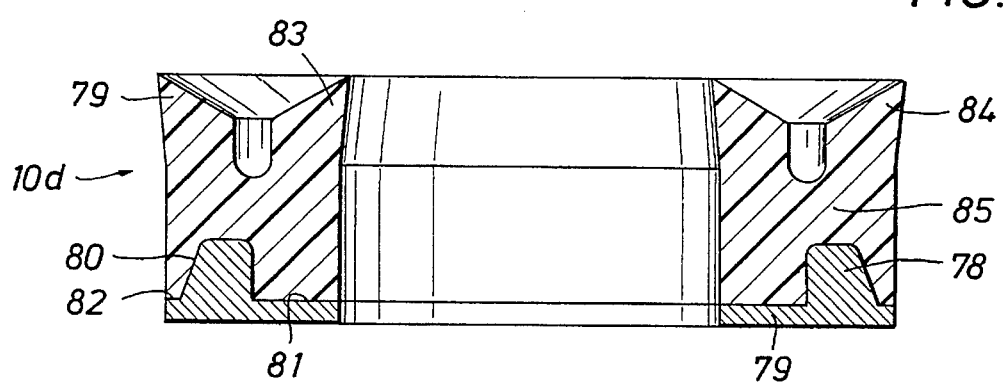
FIG. 4 is an elevational view, in section, of a replaceable sealing member having a reinforcement section with a frustoconical portion.

FIG. 4 discloses another preferred embodiment of the present invention that also includes a double lip seal. In this case, skirt 78 has a smoothly sloping or frustoconical surface 80 leading to lip support 82. Lip support 82 is axially disposed with respect to outer lip 79. The slope of frustoconical surface 80 may be adjusted as desired so that lip 84 and body 85 is sufficiently flexible to provide a good seal but is sufficiently restricted so it is less likely to experience extrusion damage. As can be appreciated, numerous possible designs are available for skin 78 and annularly extending flange portion 79. A second inner lip support 81 is axially disposed with respect to inner lip 83 for support thereof.

Figure 5:
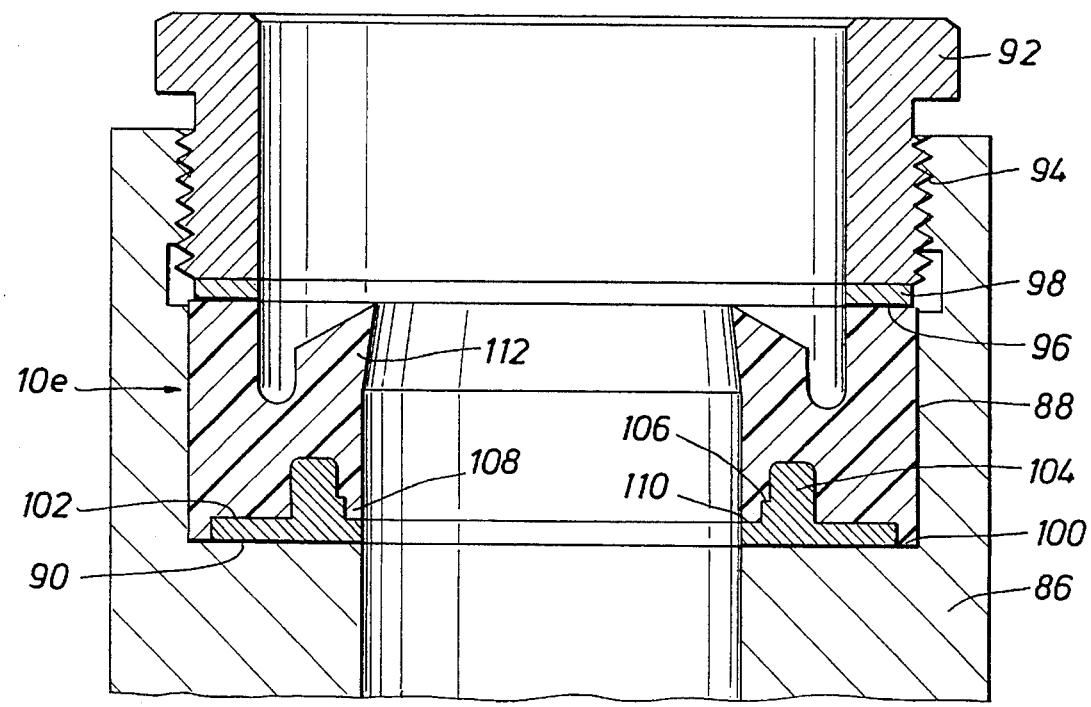
FIG. 5 is an elevational view, in section, of a replaceable sealing member with internal lip seal used for shaft sealing purposes.

Referring now to FIG. 5, sealing element 10e is used as a plunger or shaft seal and is supported within metallic shaft seal enclosure 86, which includes metallic annular wall 88 and annularly extending shoulder 90 generally transverse to annular wall 88. Threaded cap 92 retains or secures sealing member 10e within enclosure 86. Threads 94 are used to rotatably connect cap 92 with enclosure 86 and provide means for applying pressure to sealing means 10e along ridge surface 96 via sealing ring 98. Thus, sealing pressure is applied against shoulder 90 by sealing member 10e. As well, pressure is applied to elastomeric step 100, to enhance sealing around the periphery of sealing member 10e. As can be seen, annularly extending flange 102 extends outwardly towards, but does not reach, annular wall 88 of enclosure 86.

Skirt 104 includes a single step 106 within restricted region 108. In this manner, elastomeric flow is prevented or restrained past lip support surface 110. As well, lip 112 is left substantially free to perform its sealing function. While not shown, sealing members may, if appropriately modified therefore, be stacked upon each other to provide multiple sealing surfaces.

For manufacturing purposes, the sealing member of the present invention may have a lip and body portion molded to the reinforcement section along the upper surface, lip support surface, and skirt portion of the various configurations disclosed in FIGS. 1–5. The need to work with large, mud pump heavy piston hubs and the attendant problems associated therewith are eliminated. Thus, manufacturing costs are reduced. If it is desired to make a one-piece mud pump piston, the sealing members could be bonded or otherwise secured to a piston hub. In either event, however, the sealing member would be replaceable in the sense that when worn, it could be easily removed from the hub and replaced with a new sealing member. Accordingly, it would be unnecessary to handle the hub to any extent.

The lip and body sections can be made of the same or different materials and of elastomeric or resinous type materials such as, but not limited to, nitriles, neoprene, styrene-butadiene, fluoroelastomers, polyurethanes, natural rubber, and the like. Combinations of these materials may be used and reinforcement materials may be used including, but not limited to, fiberglass, aramid, polyamid, acrylic, glass, cellulosic, carbon and the like. The lip seal and body sections are more flexible or resilient than the reinforced section.

The reinforcement section of the present invention is made of a material generally having higher tensile and compressive strength and being harder and less flexible or resilient than the body or lip seal portion. Preferably, the reinforcement section is made from various metals such as brass, steel, and the like. However, non-metallic substances having relatively high tensile and compressive strengths could be used including various plastic-like materials such as, but not limited to, nylon, polyurethanes, phenolics, acetals, polyacrylates, epoxides, polycarbonates, polyester, etc. The reinforcement section may or may not include support materials such as fibrous materials. Support materials, if used, may include but are not limited to fiberglass, carbon fibers, aramids, polyesters, acrylics, cotton and the like including various combinations of the same.

In some cases, it may be desirable to have the reinforcement section to be of a material less flexible than the body and lip seal but more flexible than the piston hub. This construction limits flexibility of the sealing member adjacent the metallic piston hub to thereby prevent extrusion around the piston hub and is more useful as the thickness of the radially extending flange portion is increased.

The foregoing disclosure and description of the invention is illustrative and explanatory thereof, and it will appreciated by those skilled in the art, that various changes in the size, shape and materials as well as in the details of the illustrated construction or combinations of features of the various sealing elements may be made without departing from the spirit of the invention.

I claim:

1. A replaceable sealing member for use with a metallic annular support having an annular wall and an annularly extending shoulder portion generally transverse to said annular wall, comprising:

a reinforcement section having a radially extending annular flange portion and an annular skirt portion axially projecting from a first side of said radially extending annular flange portion, said reinforcement section having a lip support surface disposed radially to one side of said annular skirt portion on said first side of said radially extending annular flange portion;

a body bonded to said first side of said radially extending annular flange portion of said reinforcement section, said body being formed of material more resilient than that of said reinforcement section;

a flexible lip seal portion on said body, said lip seal portion being generally axially displaced from said lip support surface, said flexible lip seal portion being formed of material more resilient than that of said reinforcement section;

a first annular body wall on said body for engagement with said annular wall of said metallic annular support whereby said first annular body wall limits radial movement of said replaceable sealing member with respect to said metallic annular support;

a second annular body wall concentrically disposed with respect to said first annular body wall, said lip support surface extending to said second annular body wall and having an axial extent at said second annular body wall less than the axial extent of said skin, said skirt being disposed in said body between said first and second body walls, said skirt being radially positioned more proximal to said second annular body wall than to said first annular body wall; and an abutment surface on a second side of said radially extending annular flange portion for abutment with said annularly extending shoulder portion of said metallic annular support such that said abutment surface limits axial movement of said replaceable sealing member with respect to said metallic annular support.

2. The replaceable sealing member of claim 1, wherein said body is bonded to said reinforcement section along said lip support surface and along said annular skirt portion.

3. The replaceable sealing member of claim 1, wherein said reinforcement section is non-metallic.

4. The replaceable sealing member of claim 1, wherein said annular skin portion has a radial thickness varying from a first thickness to a second narrower thickness, said second narrower thickness being distal said flange portion in relation to said first thickness.

5. The replaceable sealing member of claim 4, wherein said annular skirt portion is stepped such that for each step directionally towards said lip support surface, said radial thickness increases to a final step with a maximum radial thickness of said annular skirt portion.

6. The replaceable sealing member of claim 4, wherein said annular skirt portion has a smoothly tapering frusto-conical surface.

7. The replaceable sealing member of claim 1, further comprising a second flexible lip seal portion such that said replaceable sealing member has two lip seals on said body disposed on a radially inward side of said body and a radially outward side of said body.

8. The replaceable sealing member of claim 7, further comprising a second lip support surface such that each of said two lip seals are generally axially displaced from a respective lip support surface.

9. The replaceable sealing member of claim 1, further comprising seal activating groove means substantially centrally disposed on an end of said body axially distal from said reinforcement section operable for promoting sealing between said annular body wall and said first annular wall of said metallic annular support.

10. The replaceable sealing member of claim 1, wherein said reinforcement section is less flexible than said body and said lip seal but is more flexible than said metallic support.

11. In combination, a replaceable sealing member and a metallic annular support, said metallic annular support having an annular wall and an annularly extending shoulder portion generally transverse to said annular wall, said combination comprising:

a reinforcement section having a radially extending annular flange portion and an annular skirt portion axially projecting from a first side of said radially extending annular flange portion, said reinforcement section having a lip support surface disposed radially to one side of said annular skirt portion on said first side of said radially extending annular flange portion;

a body bonded to said first side of said radially extending annular flange portion of said reinforcement section, said body being formed of material more resilient than that of said reinforcement section;

a flexible lip seal portion on said body, said lip seal portion being generally axially displaced from said lip support surface, said flexible lip seal portion being formed of material more resilient than that of said reinforcement section;

a first annular body wall on said body for engagement with said annular wall of said metallic annular support whereby said first annular body wall limits radial movement of replaceable sealing member with respect to said metallic annular support;

a second annular body wall concentrically disposed with respect to said first annular body wall, said lip support surface extending to said second annular body wall and having an axial extent at said second annular body wall less than the axial extent of said skirt, said skirt being disposed in said body between said first and second body walls, said skirt being radially positioned more proximal to said second annular body wall than said first annular body wall;

an abutment surface on a second side of said radially extending annular flange portion for abutment with said annularly extending shoulder portion of said metallic annular support such that said abutment surface limits axial movement of said replaceable sealing member with respect to said metallic annular support; and a securing means for securing said replaceable sealing member to said metallic annular support.

12. The combination of claim 11, wherein said first annular body wall and said annular wall of said metallic annular wall support are bonded together, and said abutment surface of said body and said annular shoulder portion of said metallic annular support are bonded together.

13. The combination of claim 11, wherein said first annular body wall is slidably engageable with respect to said annular wail of said metallic annular support.

14. The combination of claim 11, wherein said abutment surface on said second side of said radially extending annular flange is removably engageable with respect to said shoulder portion of said metallic annular support.

* * * * *

UNITED STATES PATENT AND TRADEMARK OFFICE
CERTIFICATE OF CORRECTION

PATENT NO. : 5,480,163
DATED : January 2, 1996
INVENTOR(S) : Hank T. Miser, Frederick B. Pippert, and John T. Rogers It is certified that error appears in the above-indentified patent and that said Letters Patent is hereby corrected as shown below:

In column 7, line 44, delete "skin" and insert therefor --skirt--.

In column 7, line 61, delete "skin" and insert therefor --skirt--.

In column 8, line 53, insert --said-- after "of".

Signed and Sealed this

Thirtieth Day of April, 1996

Attest:

BRUCE LEHMAN

*Attesting Officer*     *Commissioner of Patents and Trademarks*